United States Patent
Winkler et al.

[11] Patent Number: 5,645,011
[45] Date of Patent: Jul. 8, 1997

[54] FLUID FLOW INDICATOR

[75] Inventors: Bruce Winkler; Rocky Van Asten, both of Madison, Wis.

[73] Assignee: PDQ Food Stores, Inc., Middleton, Wis.

[21] Appl. No.: 282,531

[22] Filed: Jul. 28, 1994

[51] Int. Cl.$^6$ .......................... G01F 15/00; B01D 35/00
[52] U.S. Cl. .................. 116/264; 116/273; 73/323; 73/325; 210/416.4
[58] Field of Search ..................... 116/271, 272, 116/273, 274, 276, 264; 73/323, 325, 326, 328, 329, 330, 334; 141/94; 137/559, 550; 210/94, 448, 452, 416.4, 497.1

[56] References Cited

U.S. PATENT DOCUMENTS

| | | |
|---|---|---|
| 1,032,766 | 7/1912 | Paul . |
| 1,076,128 | 10/1913 | Kupferle ................... 210/448 |
| 1,110,974 | 9/1914 | Van Buskirk et al. ................ 73/326 |
| 1,239,304 | 9/1917 | Pocock ................... 73/326 |
| 1,638,066 | 8/1927 | Smythe ................... 210/94 |
| 1,673,000 | 6/1928 | Fagan . |
| 1,730,118 | 10/1929 | Cobb . |
| 1,783,379 | 12/1930 | Jacob . |
| 1,865,002 | 6/1932 | Griffin . |
| 1,904,283 | 4/1933 | Fagan et al. . |
| 1,971,120 | 8/1934 | Rice et al. ................... 210/448 |
| 2,097,535 | 11/1937 | Rugel et al. . |
| 3,080,972 | 3/1963 | Smith . |
| 3,272,337 | 9/1966 | Elwell ................... 210/448 |
| 3,317,043 | 5/1967 | Vanderpool ................... 210/94 |
| 3,458,050 | 7/1969 | Cooper ................... 210/448 |
| 4,345,468 | 8/1982 | Jackson . |
| 4,745,877 | 5/1988 | Chang . |
| 4,819,577 | 4/1989 | Campau . |
| 4,993,460 | 2/1991 | Robinson et al. . |
| 5,097,866 | 3/1992 | Shapiro-Baruch et al. ........... 137/550 |
| 5,125,269 | 6/1992 | Horst, Jr. . |
| 5,244,017 | 9/1993 | Hartman et al. . |
| 5,249,707 | 10/1993 | Simpson et al. . |
| 5,368,648 | 11/1994 | Sekizuka ................... 277/3 |

FOREIGN PATENT DOCUMENTS

| | | |
|---|---|---|
| B1-37 981/78 | 12/1978 | Australia . |
| 514360 | 3/1921 | France . |
| 2677971 | 6/1991 | France . |
| 1244517 | 9/1971 | United Kingdom . |

OTHER PUBLICATIONS

OPW® Engineered Systems promotional material for VISI-FLO® Sight Flow Indicators.

*Primary Examiner*—William A. Cuchlinski, Jr.
*Assistant Examiner*—Andrew Hirshfeld
*Attorney, Agent, or Firm*—DeWitt Ross & Stevens SC

[57] ABSTRACT

A fluid flow indicator is presented particularly for use within an existing gasoline pumping apparatus. The fluid flow indicator includes an outer cage member, a first hollow transparent cylindrical member contained within the outer cage member, and a second hollow transparent cylindrical member concentrically retained within the first hollow transparent cylindrical member. The fluid flow indicator may also include a filter member and fluid movement detection means contained within the second hollow transparent cylindrical member. The fluid flow indicator is especially designed to be retrofitted within any existing fluid flow line.

7 Claims, 3 Drawing Sheets

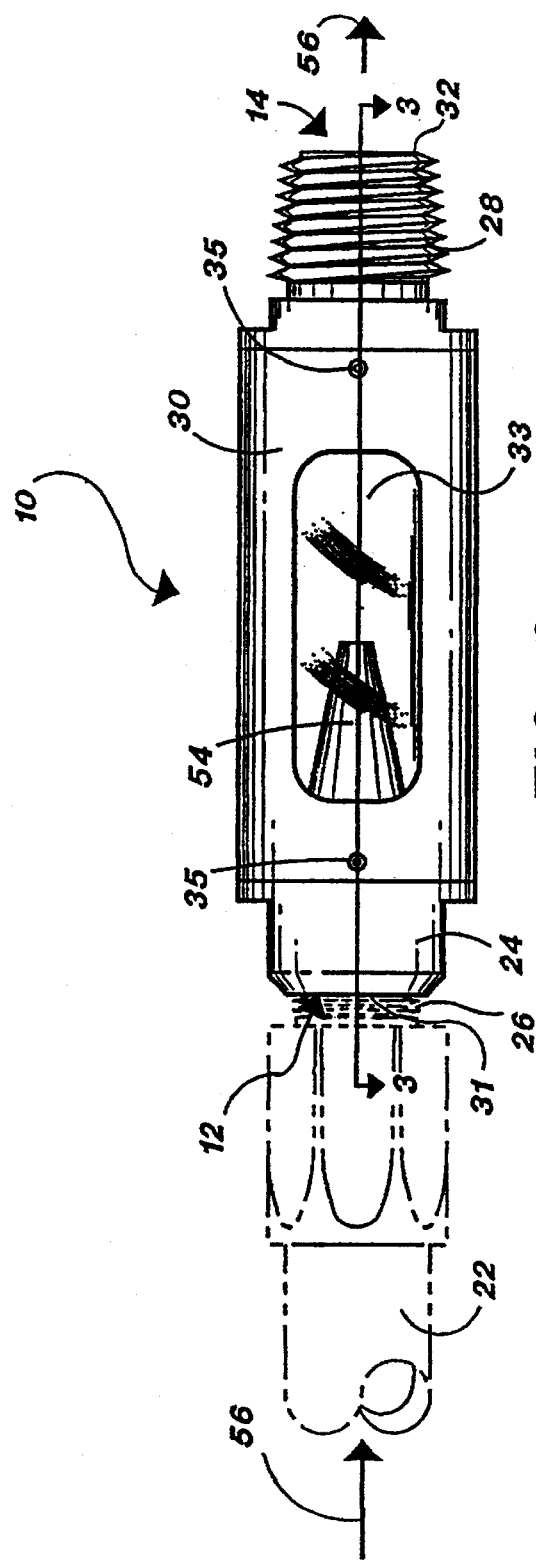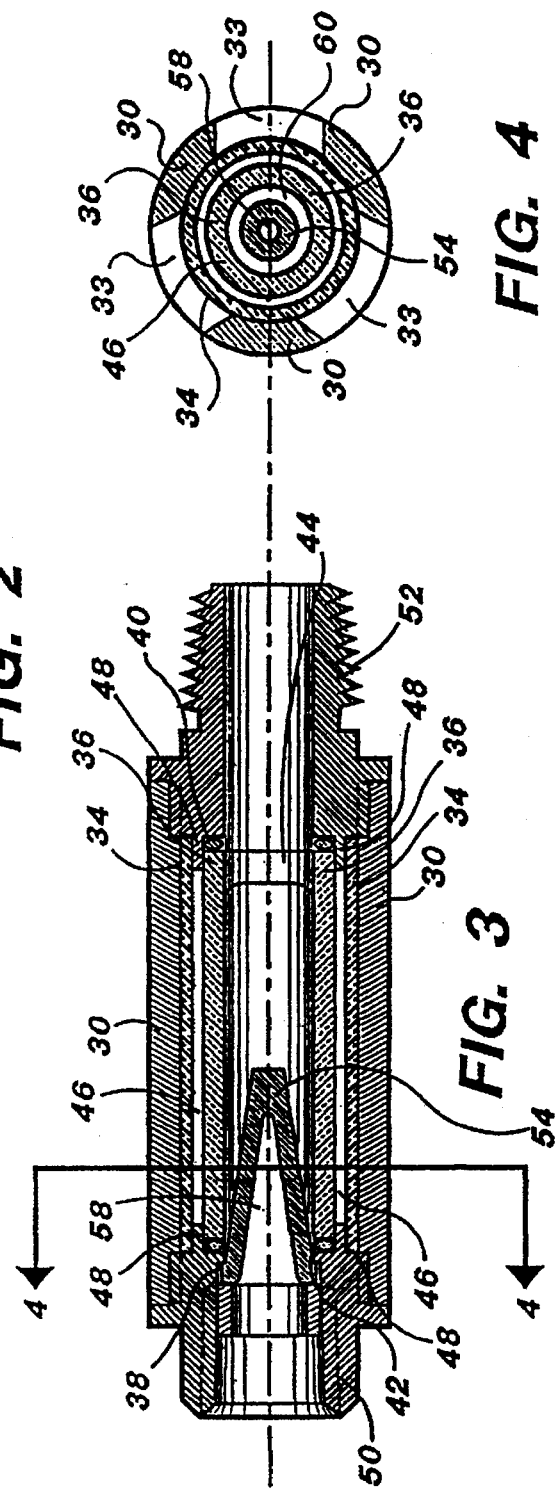

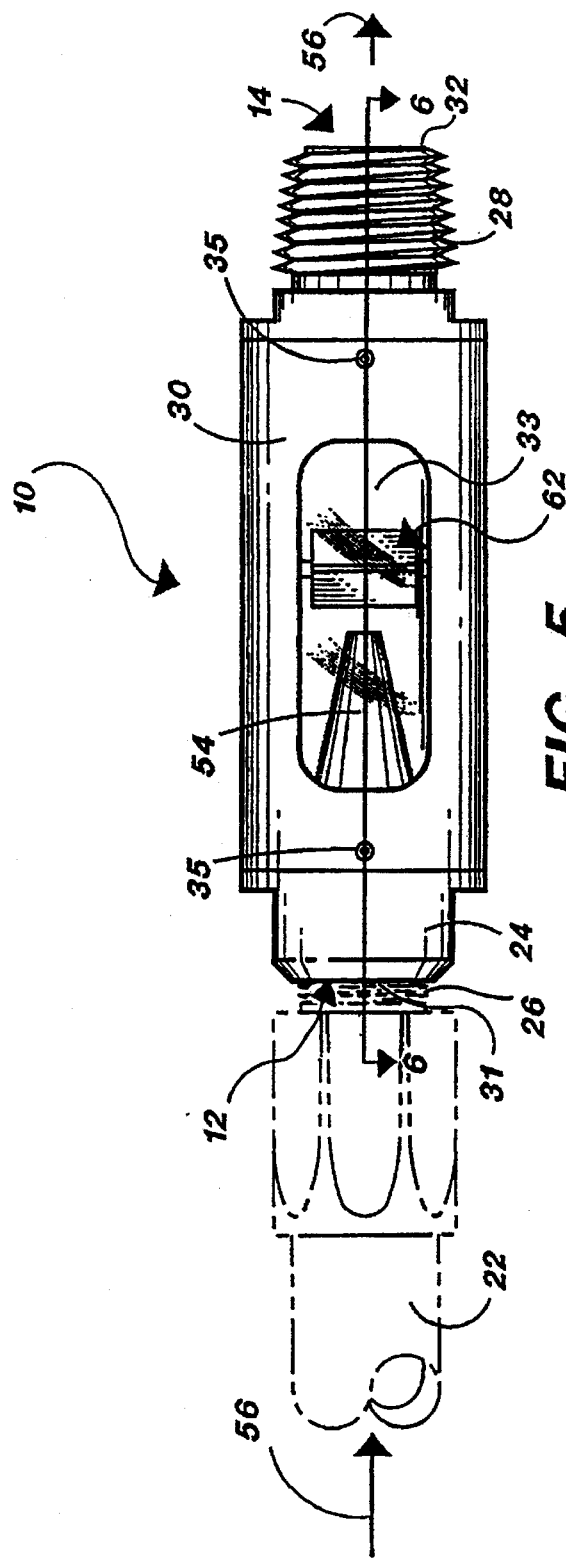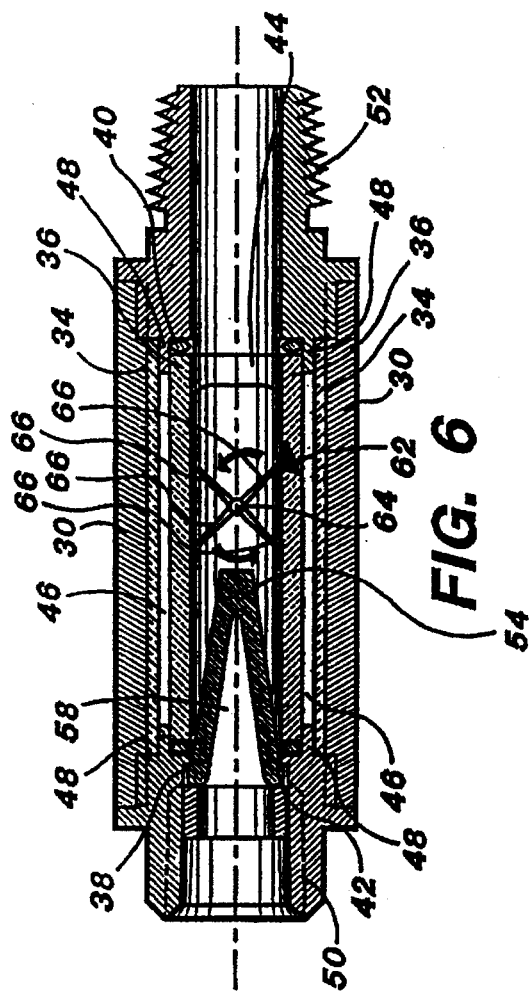

FLUID FLOW INDICATOR

FIELD OF THE INVENTION

The present invention generally relates to an apparatus for indicating fluid flow. More particularly, the present invention relates to an apparatus for viewing gasoline flow which is capable of being retrofitted to an existing gas pump handle to allow a user to see gasoline flowing from the hose as gasoline is dispensed into the gasoline tank of a motor vehicle.

DESCRIPTION OF THE PRIOR ART

Several types of flow indicators are known in the prior art. For example, U.S. Pat. No. 4,745,877 to Chang discloses a rotary sight flow indicator having a housing with a cavity which contains a rotor and its shroud, and at least one viewing window for observing the fluid and the motion of the rotor. The rotor comprises a number of radial blades attached to a rotatable shaft. The shroud is stationary and is positioned around part of the circumference which is defined by the blades.

U.S. Pat. No. 4,819,577 to Campau describes a fluid flow indicator which includes a transparent housing having an inlet, an outlet, and a transverse flow creating means positioned adjacent to the inlet. At least two spherical flow indicators are located and retained within the housing by abutments extending from the outlet.

A large number of gas flow indicators specifically designed for indicating the flow of gasoline are also known in the prior art. For example, U.S. Pat. No. 1,673,000 to Fagan discloses a gasoline flow indicator comprising a cylindrical chamber having an inlet conduit which terminates in the center of the chamber as a vertically directed outlet conduit, and an outlet conduit. The indicator also includes a pair of windows and a rotor mounted over the mouth of the inlet conduit which is visible through the windows. The Fagan device is preferably mounted beyond the meter and in the service line.

U.S. Pat. No. 1,730,118 to Cobb describes a visible dispensing device for gasoline pumps which includes a base having inlet and outlet passages, a transparent dome mounted to the base, and a ball positioned within the dome to indicate gasoline flow.

Another gasoline flow indicator is disclosed in U.S. Pat. No. 1,783,379 to Jacob. The Jacob patent describes an apparatus which comprises a transparent tubular member having inlet and outlet passages on one end and an opposite end that is closed by a cap. The apparatus also includes a rotatable indicator supported within the tubular member for indicating the gasoline flow.

U.S. Pat. No. 1,865,002 to Griffin discloses a gasoline servicing apparatus having a pipe and a transparent casing which encloses a portion of the pipe. The pipe portion contained within the casing contains inlet openings, outlet openings, and a plug contained within the pipe and located between the inlet and outlet openings. Baffle plates, having outwardly and upwardly curving edges, and floating balls are located within the casing between the inlet and outlet openings to indicate gasoline flow.

Another Fagan patent, U.S. Pat. No. 1,904,283, issued to Fagan et al. discloses a gasoline flow indicator comprising a transparent walled chamber, a shaft extending into the chamber, a flat advertising symbol and a bladed rotor mounted on the shaft, and an inlet conduit which directs fluid against the rotor blades to turn the shaft. The Fagan et al. device is designed to be mounted on an outlet conduit which extends from a dispensing tank.

U.S. Pat. No. 2,097,535 to Rugel et al. describes a liquid flow indicator for a gasoline pump which includes transparent circular housing containing a wheel having arcuate vanes for indicating the flow of gasoline when it passes through the circular housing. The Rugel et al. device is designed for attachment to a gasoline hose.

U.S. Pat. No. 4,993,460 to Robinson et al. discloses a gasoline flow indicator which is incorporated into a fuel dispensing nozzle. The indicator includes a poppet valve located within a cavity of the body of the nozzle which is manipulated by a handle to deliver fluid under pressure. A cap is attached at an opening of the cavity to close and retain the poppet valve within the cavity. A sight glass is contained in the cap and an activation device such as a spinner or sphere is located within the cavity to indicate fluid flow.

U.S. Pat. No. 5,244,017 to Hartman et al. describes a fuel and vapor flow signaling process which includes a fuel driven flow indicator located within a fuel nozzle. The indicator is in the form of a spinner.

Finally, U.S. Pat. No. 5,249,707 to Simpson et al. discloses a dispensing nozzle having a fuel flow indicator. the dispensing nozzle comprises a release valve, a main fuel flow channel, a chamber having a window located adjacent the main channel, an elongated rotatable member located within the chamber, and a means for diverting fuel flow into the chamber. The fuel flow is viewed through the top of the nozzle.

None of the foregoing patents provides a fluid flow indicator having a double-walled housing or sight glass component which is capable of being retrofitted within an existing fluid flow line. Accordingly, there is a need for a strengthened, non-breakable flow indicator which may be retrofitted within an existing fuel pumping apparatus or, alternatively within any type of fluid flow line.

SUMMARY OF THE INVENTION

It is a principal object of the present invention to provide an apparatus for indicating fluid flow in a flow line.

It is a further object of the present invention to provide a gasoline or fuel flow indicator which may be retrofitted within an existing fuel pumping apparatus between the gasoline hose and the swivel or the pumping nozzle, or alternatively, provided as a component in a new fuel pumping apparatus.

It is a still further object of the present invention to provide a gasoline flow indicator which exhibits an increased resistance to breakage.

It is yet a further object of the present invention to provide a gasoline flow indicator which includes a visible filtration means for filtering particulate matter from the gasoline prior to entering the gasoline tank of a motor vehicle.

It is still a further object of the present invention to provide a means for increasing a consumer's perceived value when purchasing gasoline for a motor vehicle.

It is still a further object of the present invention to provide a gasoline flow indicator which may also include movement detection means to further indicate the flow of the gasoline.

The fluid flow indicator of the present invention includes a cage member having first and second open ends, a first hollow transparent cylindrical member having first and second open ends contained within the cage member, and a second hollow cylindrical member having first and second open ends contained within the first hollow cylindrical member.

The gasoline flow indicator of the present invention generally includes an outer cage member having first and second open ends, a first hollow transparent cylindrical member having first and second open ends contained within the outer cage member, and a second hollow transparent cylindrical member having first and second open ends contained within the first hollow transparent cylindrical member. A female connector is located at the first end of the outer cage member for connecting the gasoline flow indicator to a gasoline hose and a male connector is located at the second end of the outer cage member for connecting the gasoline flow indicator to the swivel which precedes the gasoline pump handle or to the handle end itself of a gasoline pump nozzle. This configuration results in a gasoline flow indicator which is capable of being retrofitted into an existing gasoline pumping apparatus without the need for additional adjustments or parts. The gasoline flow indicator may also include a filter member and/or a fluid movement detection means contained within the second hollow transparent cylindrical member.

The objects and advantages of this invention will appear more fully from the following more detailed description of the preferred embodiments of the invention made in conjunction with the accompanying drawings.

BRIEF DESCRIPTION OF THE DRAWINGS

FIG. 2 is a front elevational view of the fluid flow indicator of the present invention shown connected to a fluid flow line shown in phantom at one end with arrows showing the direction of fluid flow.

FIG. 3 is a cross sectional view of the fluid flow indicator of the present invention taken along line 3—3 of FIG. 2.

FIG. 4 is a cross-sectional view of the fluid flow indicator of the present invention taken along line 4—4 of FIG. 3.

FIG. 5 is an alternative embodiment of the fluid flow indicator of the present invention shown connected to a fluid flow line shown in phantom at one end with arrows showing the direction of fluid flow.

FIG. 6 is a cross-sectional view of an alternative embodiment of the fluid flow indicator of the present invention taken along line 6—6 of FIG. 5.

DETAILED DESCRIPTION OF THE INVENTION

Figure 1:
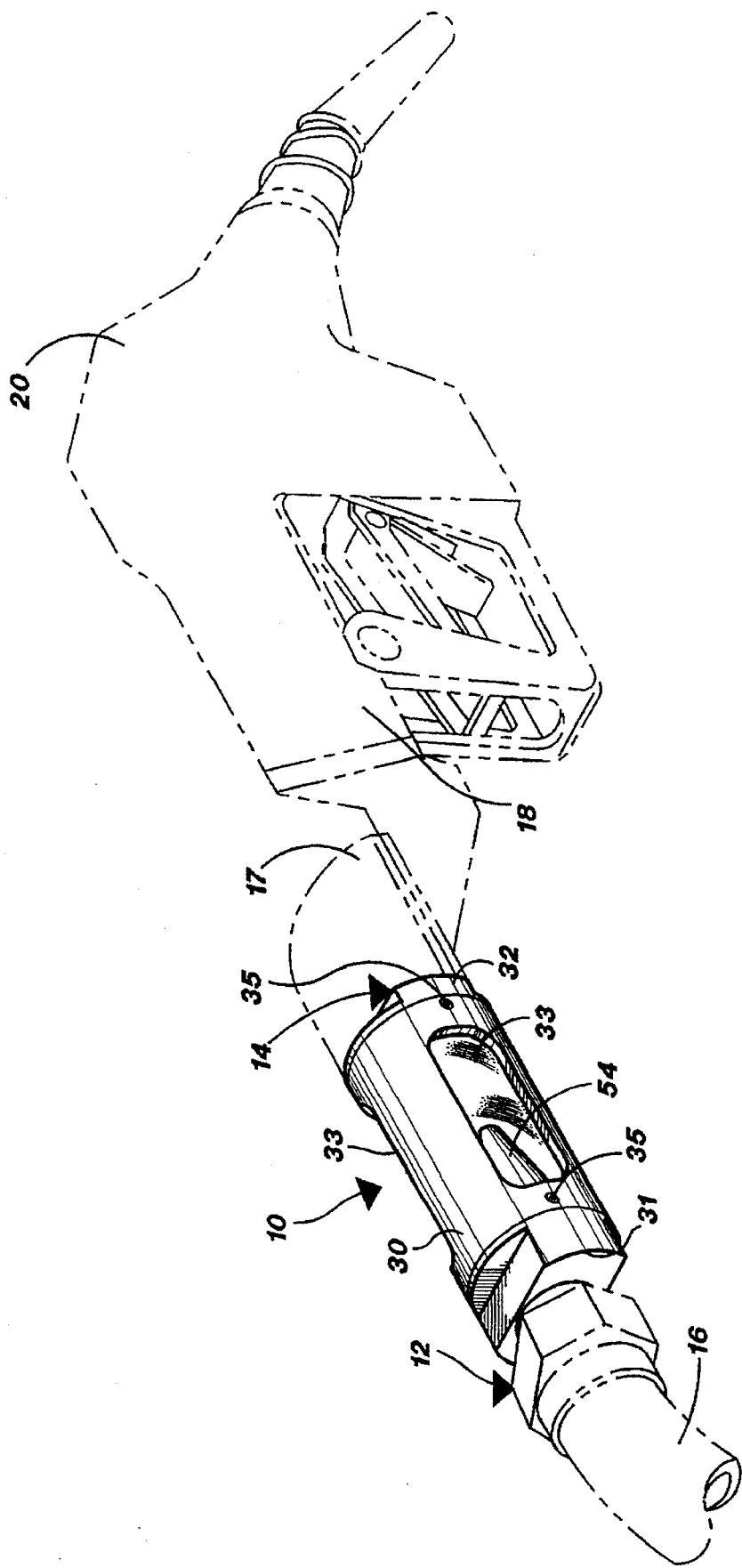
FIG. 1 is a perspective view of the gasoline flow indicator of the present invention shown retrofitted within an existing gasoline pumping apparatus shown in phantom.

The preferred embodiments of the present invention are best illustrated with reference to the accompanying figures. The same reference numbers are used throughout the several figures to identify the same features of the invention. Referring now to the figures, FIG. 1 illustrates a perspective view of the fluid flow indicator 10 of the present invention shown retrofitted within an existing gasoline pumping apparatus.

The fluid flow indicator 10 has a first open end 12 and a second open end 14. The fluid flow indicator 10 is retrofitted within an existing gasoline pumping apparatus by first disconnecting the gasoline hose 16 of the existing pumping apparatus from the swivel piece 17 which is attached to the handle end 18 of the gasoline pumping nozzle 20. The swivel piece 17 rotates at a central planar axis to allow the gasoline pumping nozzle 20 to rotate on a horizontal plane with respect to the gasoline hose 16. Next, the first open end 12 of the fluid flow indicator 10 is connected to the gasoline hose 16 and the second open end 14 of the fluid flow indicator 10 is connected to the swivel piece 17. Alternatively, the fluid flow indicator 10 may reside between the gasoline hose 16 and the handle end 18 of the gasoline pumping nozzle 20 if no swivel piece 17 is present. The gasoline flowing from the gasoline hose 16 and gasoline pumping nozzle 20 can now be detected by viewing the fluid flow indicator 10. FIG. 2 shows a front elevational view of the fluid flow indicator 10 shown connected to a fluid flow line 22. The first open end 12 of the fluid flow indicator 10 comprises a female connector 24 so that the male connector end 26 of the fluid flow line 22 can be connected to the fluid flow indicator 10. The second open end 14 of the fluid flow indicator 10 comprises a male connector 28 which enables the fluid flow indicator 10 to be connected to the swivel piece 17 or the handle end 18 of the gasoline pumping nozzle 20.

As illustrated in FIGS. 1 and 2, the fluid flow indicator 10 comprises an outer cage member 30 which contains a first open end 31, a second open end 32, and a plurality of equally spaced longitudinal openings 33 located around a circumference of the outer cage member 30. The plurality of equally spaced longitudinal openings 33 enable one to view the interior of the fluid flow indicator 10 as well as the fluid which flows through the fluid flow indicator 10. The outer cage member 30 is preferably made of metal, such as stainless steel or aluminum, or a similar material which is capable of forming strong and durable female and male connector ends. Alternatively, separate female and male connector ends may be connected to the first and second open ends 31,32 of the outer cage member 30. Furthermore, the outer cage member 30 is preferably comprised of stainless steel so that the flow indicator device will be capable of undergoing an increased amount of resistive force without breaking if a user forgets to remove the gasoline pump handle from the motor vehicle before driving the motor vehicle away.

The fluid flow indicator 10 also comprises tamper proof set screws 35. The set screws 35 function to prevent the disassembly of the fluid flow indicator components once the fluid flow indicator 10 has been assembled and sealed.

Turning now to FIG. 3, there is shown a cross section of the fluid flow indicator 10 which more clearly illustrates the component parts of the fluid flow indicator 10 of the present invention. The fluid flow indicator 10 comprises an outer cage member 30, a first hollow transparent cylindrical member 34 contained within the outer cage member 30, and a second hollow transparent cylindrical member 36 concentrically retained within the first hollow transparent cylindrical member 34.

The first hollow transparent cylindrical member 34 includes a first open end 38 and a second open end 40 which are aligned with the first and second open ends 31, 32 of the outer cage member 30. The first hollow transparent cylindrical member 34 is preferably comprised of a non-breakable material, such as polycarbonate, acrylic, or polyvinyl chloride, so that the fluid flow indicator 10 will not be destroyed upon the dropping or banging of the device against a strong solid surface. The first hollow transparent cylindrical member 34 serves as a protective element that encases the second hollow transparent cylindrical member 36 which may be comprised of a material more fragile than the composition of the first hollow transparent cylindrical member 34.

The second hollow transparent cylindrical member 36 comprises a first open end 42 and a second open end 44 which are concentrically retained within, and aligned with, the first and second open ends 38, 40 of the first hollow transparent cylindrical member 34, respectively. The second hollow transparent cylindrical member 36 is preferably comprised of an inert material, such as glass polyvinyl chloride, quartz, or silicone, which will not interact with gasoline or other types of fluids which may be used with the fluid flow indicator 10.

The second hollow transparent cylindrical member 36 is concentrically retained within the first hollow transparent cylindrical member 34 such that an air space 46 exists between the hollow transparent cylindrical members 34, 36. The air space 46 is achieved by providing female and male connectors 50, 52 which comprise projections 48 extending outwardly from the ends of the female and male connectors 50, 52 and into the internal area of the outer cage member 30 which accommodates the first and second hollow transparent cylindrical members 34, 36. The projections 48 are positioned between the first and second hollow transparent cylindrical members 34, 36 near their respective first open ends 38, 42 and respective second open ends 40, 44. The projections 48 in FIG. 3 comprise part of the separate female and male connector ends 50, 52 which are connected to the first and second open ends 31, 32 of the outer cage member 30. Alternative means for creating the air space 46 located between the first and second hollow transparent cylindrical members 34, 36, such as inserting an O-ring or other types of spacers between the cylinders 34, 36, are also contemplated. The air space 46 may be filled with a liquid to keep vapor from forming during the operation of the fluid flow indicator 10.

The fluid flow indicator 10 may further comprise a filter member 54. The filter member 54 is generally cone shaped and hollow with the bottom of the hollow cone positioned near the first open end 12 of the fluid flow indicator 10. The filter member 54 is preferably comprised of plastic, brass, or stainless steel. The direction of fluid flow 56 through the fluid flow indicator 10 is shown in FIG. 2. The fluid flows into the first open end 12 of the fluid flow indicator 10, through the filter member 54, and out through the second open end 14 of the fluid flow indicator 10. A user may view the fluid flow by looking through the first and second hollow transparent cylinders 34, 36 which are visible through the plurality of openings 33 contained within the outer cage member 30.

A cross-sectional view taken across the diameter of the fluid flow indicator 10 is shown in FIG. 4. Fluid first flows through the hollow portion 58 of the filter member 54. The fluid then flows to the interior 60 of the second hollow transparent cylindrical member 36. As previously described, the fluid flow can be seen through the first and second cylinders 34, 36 which are visible through the plurality of openings 33 contained within the outer cage member 30.

FIGS. 5 and 6 show an alternative embodiment of the fluid flow indicator 10 of the present invention. The alternative embodiment of the fluid flow indicator 10 comprises the same components as the previously described embodiment with one exception. The alternative embodiment of the fluid flow indicator 10 includes a fluid movement detection means 62 contained within the second hollow transparent cylindrical member 36. The fluid movement detection means 62 is positioned between the filter member 54 and the second open end 14 of the fluid flow indicator 10. Further, the fluid movement detection means 62 is preferably anchored within the second hollow transparent cylindrical member 36 by attachment to the interior sides of the second hollow transparent cylindrical member 36.

The fluid movement detection means 62 may comprise a number of different shapes such as a sphere or pin member 64 with rotating blades 66. The movement of the fluid movement detection means 62 functions to emphasize the fluid flow through the fluid flow indicator 10.

While preferred forms of the invention have been shown in the drawings and described, since variations in the preferred forms will be apparent to those skilled in the art, the invention should not be construed as limited to the specific forms shown and described, but instead is as set forth in the following claims.

What is claimed is:

1. A fluid flow indicator comprising:
   (a) a cage member having a first open end, a second open end, and a window therebetween;
   (b) a first transparent cylindrical member contained within the cage member, wherein the first member has a first open end and a second open end; and
   (c) a second transparent cylindrical member contained within the first transparent cylindrical member, wherein the second member has a first open end and a second open end, the window having a width approximately equal to the diameter of the second transparent cylindrical member;
   (d) two metal spacers, one of the metal spacers being located between the first open ends of the first and second members, and the other of the metal spacers being located between the second open ends of the first and second members; and
   (e) a conical filter member located within the second transparent cylindrical member, the conical filter member including a wide filter base and a narrow filter tip, the wide filter base being located adjacent the first open end of the second transparent cylindrical member and the narrow filter tip being generally centrally located along the length of the window, and wherein the first open end of the second member serves as a fluid inlet.

2. The fluid flow indicator of claim 1 further comprising a space between the first transparent cylindrical member and the second transparent cylindrical member.

3. The fluid flow indicator of claim 1 further comprising a fluid movement detection means contained within the second transparent cylindrical member.

4. The fluid flow indicator of claim 3 wherein the fluid movement detection means comprises a spinner having rotatable blades.

5. The fluid flow indicator of claim 1 wherein the first end of the cage member comprises a female connector end and the second end of the cage member comprises a male connector end.

6. The fluid flow indicator of claim 1 wherein the first transparent cylindrical member is made of a material selected from the group consisting of polycarbonate, acrylic, and polyvinyl chloride.

7. The fluid flow indicator of claim 1 wherein the second transparent cylindrical member is made of a material selected from the group consisting of glass, polyvinyl chloride, quartz, and silicone.

* * * * *